United States Patent
Yanagiguchi

(10) Patent No.: US 6,704,266 B2
(45) Date of Patent: Mar. 9, 2004

(54) DISK APPARATUS

(75) Inventor: Kiyoshi Yanagiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/946,508

(22) Filed: Sep. 6, 2001

(65) Prior Publication Data

US 2002/0110072 A1 Aug. 15, 2002

(30) Foreign Application Priority Data

Feb. 13, 2001 (JP) ........................ 2001-035154

(51) Int. Cl.⁷ .................... G11B 17/03; G11B 17/04
(52) U.S. Cl. ................................... 369/75.2
(58) Field of Search ................ 369/75.1, 75.2, 369/77.1, 77.2

(56) References Cited

U.S. PATENT DOCUMENTS

| | | | | | |
|---|---|---|---|---|---|
| 5,872,765 A | * | 2/1999 | Osada | ........................ | 369/30.7 |
| 5,995,468 A | * | 11/1999 | Furukawa | ................... | 369/77.1 |
| 6,061,320 A | * | 5/2000 | Tsai | ........................... | 369/75.2 |
| 6,496,463 B1 | * | 12/2002 | Ogawa et al. | ............. | 369/75.2 |

FOREIGN PATENT DOCUMENTS

| | | | | |
|---|---|---|---|---|
| EP | 917140 A2 | * 5/1999 | ........... | G11B/17/04 |
| JP | 04345956 A | * 12/1992 | ........... | G11B/17/04 |
| JP | A10208347 | 8/1998 | | |
| JP | 10283756 A | * 10/1998 | ........... | G11B/25/04 |
| JP | 11185338 A | * 7/1999 | ........... | G11B/17/04 |
| JP | 11353752 A | * 12/1999 | ........... | G11B/17/04 |
| JP | 2000090532 A | * 3/2000 | ........... | G11B/17/04 |

* cited by examiner

*Primary Examiner*—William Klimowicz
(74) *Attorney, Agent, or Firm*—Birch, Stewart, Kolasch & Birch, LLP

(57) ABSTRACT

A disk apparatus has a slider cam, disk tray, and reproducing assembly. The slider cam has a cam groove. The slider cam moves between a first position and a second position, to retract a disk tray into the apparatus and extend from the apparatus, respectively. The reproducing assembly has a cam follower guided in the cam groove to move between a reproducing position and a non-reproducing position. The cam groove has first, second, and third grooves. The third groove connects the first and second grooves together. The first groove has a groove wall that extends substantially perpendicularly to the axis. The cam follower moves along the first groove to collide against the wall when a shock is given to the apparatus during transportation, thereby preventing the disk tray from popping out of the apparatus inadvertently.

8 Claims, 13 Drawing Sheets

DISK APPARATUS

BACKGROUND OF THE INVENTION

1. Field of the Invention

The present invention relates to a disk apparatus that performs the recording information on and reproducing information from a disk such as a CD and a DVD, and more particularly to a disk-loading mechanism that performs the loading and unloading of a disk as well as clamping and unclamping the disk with respect to the reproducing unit.

2. Description of the Related Art

Construction

FIG. 9 is an exploded perspective view of a disk mechanism of a conventional disk apparatus.

FIGS. 11 and 12 are top views of the disk apparatus of FIG. 9.

FIGS. 13A–13C are illustrative diagrams, illustrating the operation of the apparatus.

Referring to FIG. 9, a loader base 21 includes sidewalls 21c and 21d opposing each other with a top table 21a disposed therebetween. A disk damper 21b is disposed at a predetermined position of the top table 21a. The sidewalls 21c and 21d have guide rails, not shown, on which a disk tray 22 is slidingly supported such that the disk tray 22 can move back and forth on a Y-axis. The disk tray 22 has a disk-shaped recess in which a disk 23 is received and an opening 22b through which a reproducing unit 30 upwardly faces the disk 23.

FIG. 10 is a perspective view of a pertinent portion of the disk apparatus of FIG. 9.

A slider cam holder 21e supports a slider cam 24 such that the slider cam 24 can slide back and forth on an X-axis. The slider cam 24 has an upright boss 24a, a gear assembly 26, and a loading motor 25. The gear assembly 26 includes a pinion gear 26b and a wheel gear 26a. The wheel gear 26a and the pinion gear 26b are rotatable about a Z-axis that passes through the wheel gear 26a and the pinion gear 26b. The wheel gear 26a is in mesh with a worm gear 25a connected to a shaft of the loading motor 25, so that when the loading motor 25 runs, the worm gear 25a transmits the rotation of the loading motor to the wheel gear 26a. A worm-gear drive has a worm gear and a wheel gear in mesh with the worm gear. Many worm-gear drives are of the construction that rotation is transmitted from a worm gear to a wheel gear but not from the wheel gear to the worm gear. The term "self-lock" is used to cover this construction in this specification. Some worm-gear drives are of the construction that rotation is transmitted from a worm gear to a wheel gear and from the wheel gear to the worm gear. Whether a worm-gear drive is of a self-lock type depends on the combination of the lead angle and friction coefficient between the worm gear and the wheel gear. The worm gear 25a and wheel gear 26a form a non-self-lock type worm-gear drive, i.e., rotation can be transmitted bidirectionally between the worm gear 25a and the wheel gear 26a. The non-self-lock type worm-gear drive is employed so that the user place, for example, a CD into the tray at the tray-open position and then pushes the tray into the reproducing unit. The shaft of the loading motor 25 is free to rotate when the loading motor 25 is not switched on.

The slider cam 24 has a cam groove 27 formed in a side wall 24b that lies in a plane in which the X-axis and Z-axis lie. The cam groove 27 includes an upper horizontal groove 27a, a lower horizontal groove 27b, and an inclined groove 27c through which the upper horizontal groove 27a communicates with the lower horizontal groove 27b.

A lift arm 28 (FIG. 9) has a pair of pins 28a and 28b that project from the lift arm 28 outward in opposite directions and is in line with each other. The pins 28a and 28b loosely extend into holes 21g and 21f formed in the wall 21d and 21c of the loader base 21, respectively, so that the lift arm 28 is pivotal about the pins 28a and 28b. The lift arm 28 has a projection 28c that loosely fits into the cam groove 27 formed in the slider cam 24.

Referring back to FIG. 9, the reproducing unit 30 has coupling portions or screws 30a, 30b, and 30c by which the reproducing unit 30 is assembled to the loader base 21. The screw 30a supported on a support portion 21h of the loader base 21 through a damper 30d. The screws 30b and 30c are coupled to support portions 28d and 28e on the lift arm 28 through dampers 30e and 30f, respectively, such that the reproducing unit 30 is suspended from the lift arm 28. The reproducing unit 30 has primarily a turntable 30g and an optical pickup 30h. The turntable 30g cooperates with the disk clamper 21b so that a disk is sandwiched between the disk damper 21b and the turntable 30g.

FIG. 11 illustrates the disk apparatus as seen on the Z-axis toward the origin (i.e., when seen from above). Referring to FIG. 11, the disk apparatus illustrated in FIG. 9 have been assembled such that the disk tray 22 is at a loading position and the reproducing unit 30 is at a later described reproducing position.

A rack gear 22c is formed on the underside of the disk tray 22 and includes three portions: a linear side portion 22d that extends on the Y-axis along the side of the disk tray, a linear front portion 22e, and a curved portion 22f that connects the linear side portion 22d and the linear front portion 22e. There is provided a guide groove 22g, which extends along the rack gear 22c and has a home portion 22h that is parallel to the linear front portion 22e.

The slider cam 24 is held on the loader base 21 under the disk tray 22 and is slidable on the X-axis. The pinion gear 26b of the slider cam 24 is in mesh with the rack gear 22c, and the upright boss 24a extends into the guide groove 22g to slide along it.

Tray-ejecting Operation

A tray-ejecting operation is performed to eject the disk tray 22 both when a disk is loaded prior to the reproduction of information from the disk and when the disk is unloaded after the reproduction of information.

Referring to FIG. 11, the slider cam 24 has moved completely on the X-axis away from the origin so that the boss 24a is at the home portion 22h.

FIG. 13A illustrates the cam groove 27 formed in the slider cam 24 and the projection 28c of the lift arm 28 when they are seen on the Y-axis toward the origin.

Referring to FIG. 13A, the lift arm 28 is at a position where the projection 28c is in the upper horizontal grooves 27a. The turntable 30g of the reproducing unit 30 and the disk damper 21b cooperate to hold a disk sandwiched therebetween. In the specification, this state is referred to as a standby state of the disk apparatus.

When the loading motor 25 is switched on to drive the pinion gear 26b in a direction shown by arrow A (FIG. 11) about the Z-axis, the rotation of the pinion gear 26b causes the slider cam 24 to move on the X-axis toward the origin. Thus, as shown in FIG. 13B, the cam engagement between the projection 28c and groove 27 causes the projection 28c to move along the inclined groove 27c toward the lower horizontal groove 27b, so that the lift arm 28 slowly pivots in a direction shown by arrow C about the X-axis to depress the coupling sections 30b and 30c. Thus, the reproducing unit 30 is tilted downward. The inclination of the reproducing unit 30 causes the turntable 30g to tilt downward so that the turntable 30g leaves the disk damper 21b to release the disk from the sandwiched engagement with the turntable 30 and the damper 21b.

The pinion gear 26b continues to rotate in the direction shown by arrow A, so that the slider cam 24 moves on the X-axis toward the origin and finally reaches a position shown in FIG. 13C where the projection 28c is in the lower horizontal groove 27b and therefore the reproducing unit 30 is at its maximum inclination. The reproducing unit 30 is supported at three dampers 30d, 30e, and 30f that allow the reproducing unit 30 to incline smoothly.

The pinion gear 26b further continues to rotate, so that the projection 28c of the lift arm 28 moves from the right end of the lower horizontal groove 27b to the left end.

Shortly after the projection 28c reaches the position of FIG. 13C, the pinion gear 26b starts to move into meshing engagement with the curved portion 22f (FIG. 11) of the rack gear 22c of the slider cam 24. When the pinion gear 26b moves along the curved portion 22f, the rotation of the pinion gear 26b causes the slider cam 24 to move on the X-axis toward the origin while also causing the disk tray 22 to gradually move on the Y-axis toward the origin. The pinion gear 26b finally reaches the end of the curved portion 22f so that the slider cam 24 reaches the end of its moving path. However, the pinion gear 26b still continues to rotate in the direction shown by arrow A to enter meshing engagement with the linear portion of the rack gear 22c but the slider cam 24 no longer moves on the X-axis. Instead, the disk tray 22 is caused to move faster on the Y-axis toward the origin, i.e., outwardly of the apparatus. When the disk tray 22 has reached a predetermined unloading position, the loading motor 25 stops.

When a disk such as a CD, DVD or the like is played, the disk is first placed in the recess 22a in the disk tray 22 that is at the unloading position. Then, the loading motor 25 is switched on to run in a reverse direction such that the pinion gear 26b rotates in a direction shown by arrow B. The disk tray 22 moves on the Y-axis away from the origin, initiating the loading operation in which the operation of the apparatus takes place in a reverse order to the previously described unloading operation. When the disk tray 22 reaches the loading position, the slider cam 24 slides on the X-axis away from the origin to eventually enter the standby state, passing the positions shown in FIG. 13C, FIG. 13B, and FIG. 13A in order.

When the disk apparatus of the aforementioned construction is transported, the respective sections of the apparatus are set to the standby state shown in FIG. 11 but no disk is loaded.

When a shock in a direction parallel to the X-axis is given to the disk apparatus, the slider cam 24 also receives a shock in the same direction. The shock causes the slider cam 24 to move on the X-axis. Because the motor 25 is not switched on, it is free to rotate so that the pinion gear 26b rotates as the slider cam 24 moves on the X-axis. As shown in FIG. 13B, the projection 28c of the lift arm 28 moves into engagement with the inclined groove 27c formed in the slider 24. If shocks are applied repeatedly in the same direction, the projection 28c moves on the Z-axis due to the cam engagement with the inclined groove 27c and the weight of the reproducing unit 30. As a result, the projection 28c eventually moves into engagement with the lower horizontal groove 27b as shown in FIG. 13C to finally abut the left end of the lower horizontal groove 27b.

As described above, the lift arm 28 rotates in the direction shown by arrow C, so that the reproducing unit 30 is inclined to cause the turntable 30g to leave the disk damper 21b downward. With this condition, when a shock is given in the direction of the Y-axis toward the origin, the disk tray 22 will move out of the loading position and the apparatus may be damaged during transportation.

SUMMARY OF THE INVENTION

The present invention was made in view of the aforementioned drawbacks.

An object of the invention is to provide a disk-apparatus in which a disk tray is prevented from moving from a disk loading position to disk-unloading position, i.e., popping out of the apparatus during the transportation of the apparatus.

A disk apparatus has a slider cam, a disk tray, and a reproducing assembly. The slider cam is movable on a first axis back and forth between a first position and a second position, said slider cam having a cam groove. The disk tray is movable on a second axis perpendicular to the first axis between a third position (disk-loading position) and a fourth position (disk-unloading position). The slider cam is at the first position when the disk tray is at the third position and at the second position when the disk tray is at the fourth position. The reproducing assembly has a cam follower. The cam follower is guided in the cam groove such that said reproducing assembly is at a reproducing position when said slider cam is at the first position and at a non-reproducing position when said slider cam is at the second position. The cam groove includes a first portion, a second portion, and a third portion. The first portion extends substantially parallel to the first axis. The second portion extends substantially parallel to the first axis. The third portion communicates with a first longitudinal end portion of the first portion and a second longitudinal end portion of the second portion to form a path of the cam follower at an obtuse angle with the first and second portions. The first longitudinal end portion has a groove wall that extends substantially perpendicularly to the first axis.

The first portion has a first longitudinal end and a second longitudinal end and the second portion has a third longitudinal end and a fourth longitudinal end. The third portion may communicates with the first portion between the first and second longitudinal ends and with the second portion between the third and fourth longitudinal ends to form a path of the cam follower at an obtuse angle with the first and second portions.

The cam groove extends in a plane perpendicular to the second axis.

The cam follower is in the first portion when said slider cam is at the first position and in the second portion when said slider cam is at the second position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIGS. 8A and 8B illustrate inclined upper horizontal grooves 2a and 6a.

DETAILED DESCRIPTION OF THE INVENTION

The present invention will be described in detail by way of example.

First Embodiment

Figure 1:
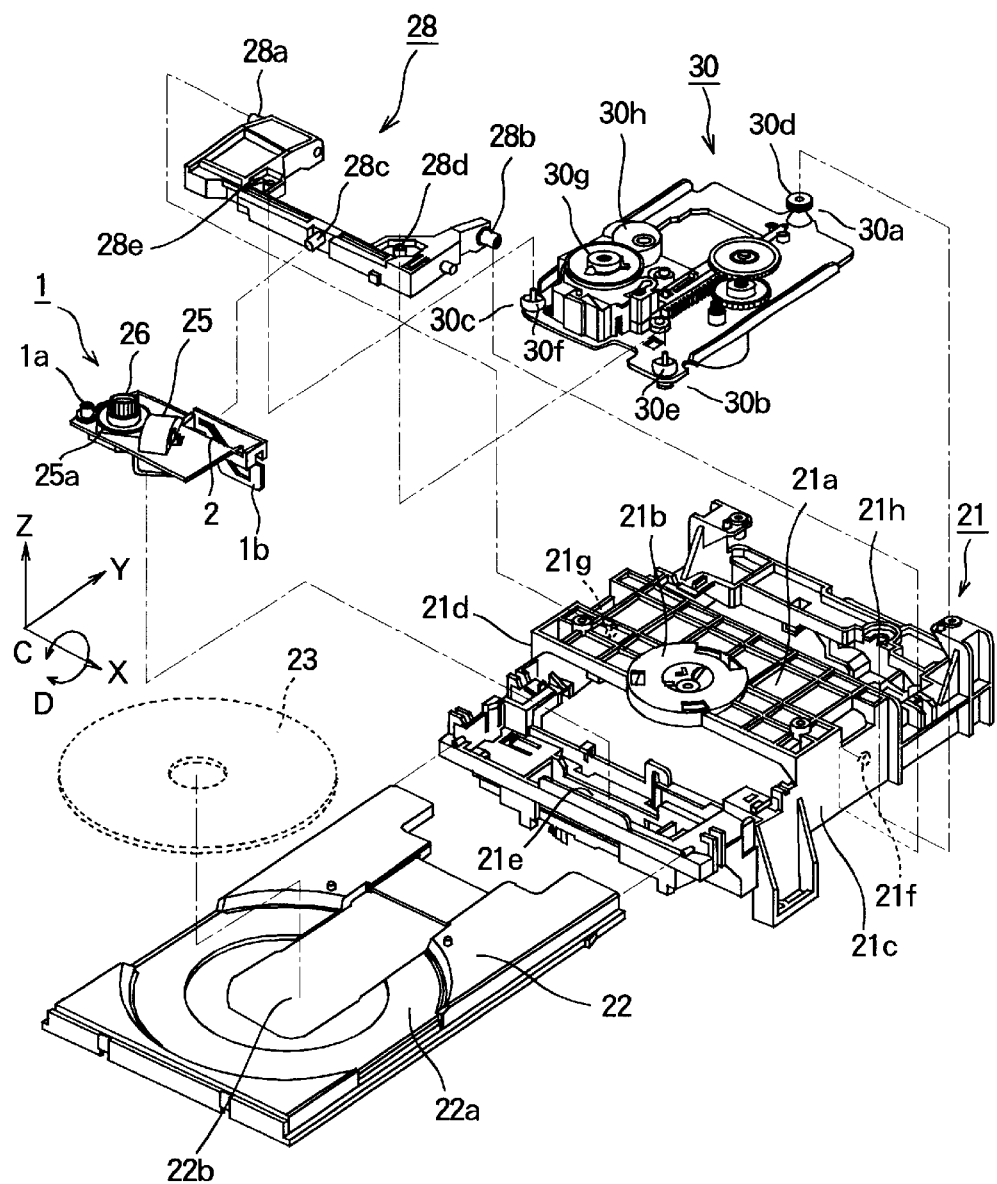
FIG. 1 is an exploded view illustrating a first embodiment of a disk apparatus according to the invention.

FIG. 1 is an exploded view, illustrating a first embodiment of a disk apparatus according to the invention.

Figure 2:
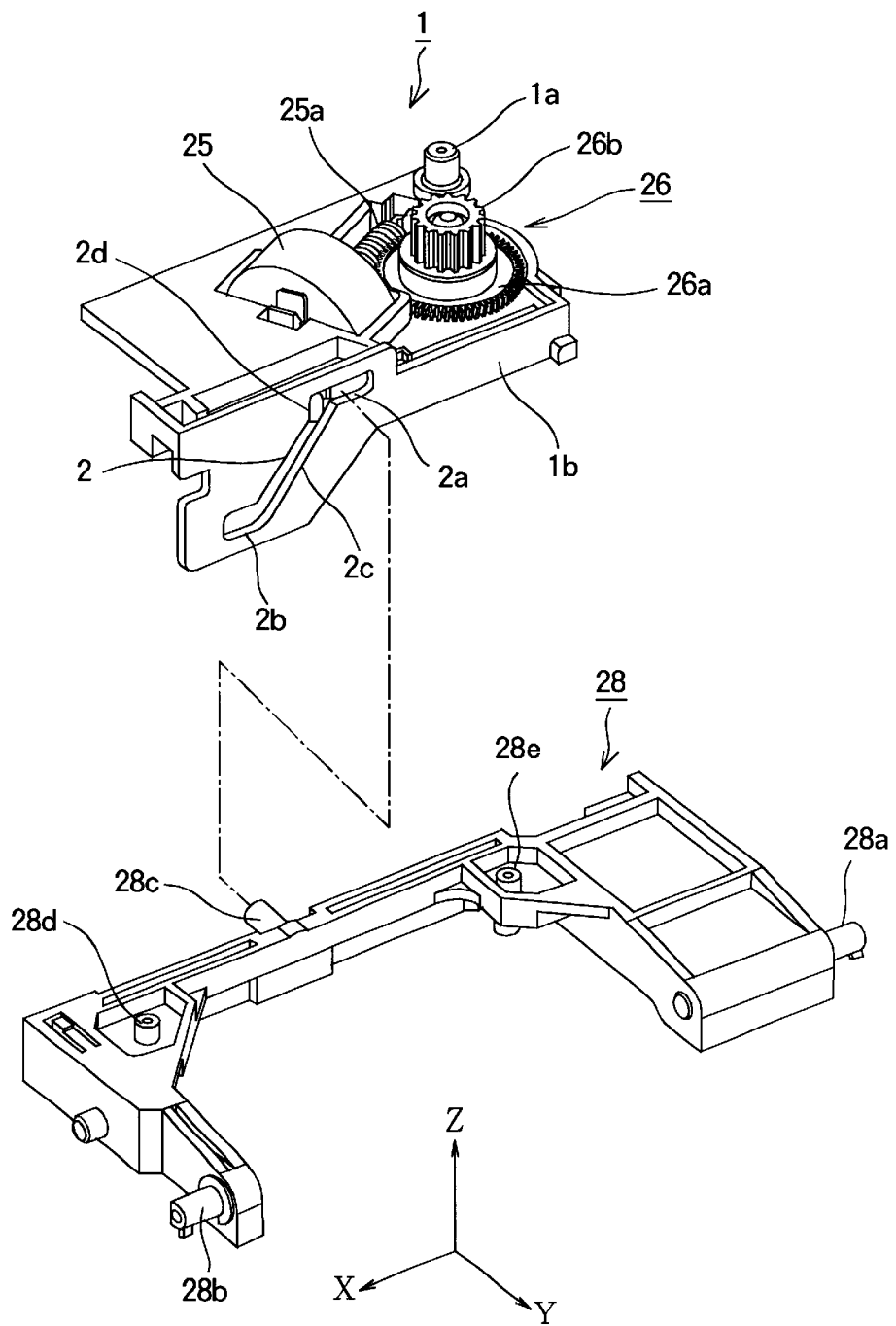
FIG. 2 is a perspective view illustrating a pertinent portion of the disk apparatus.
Figure 3:
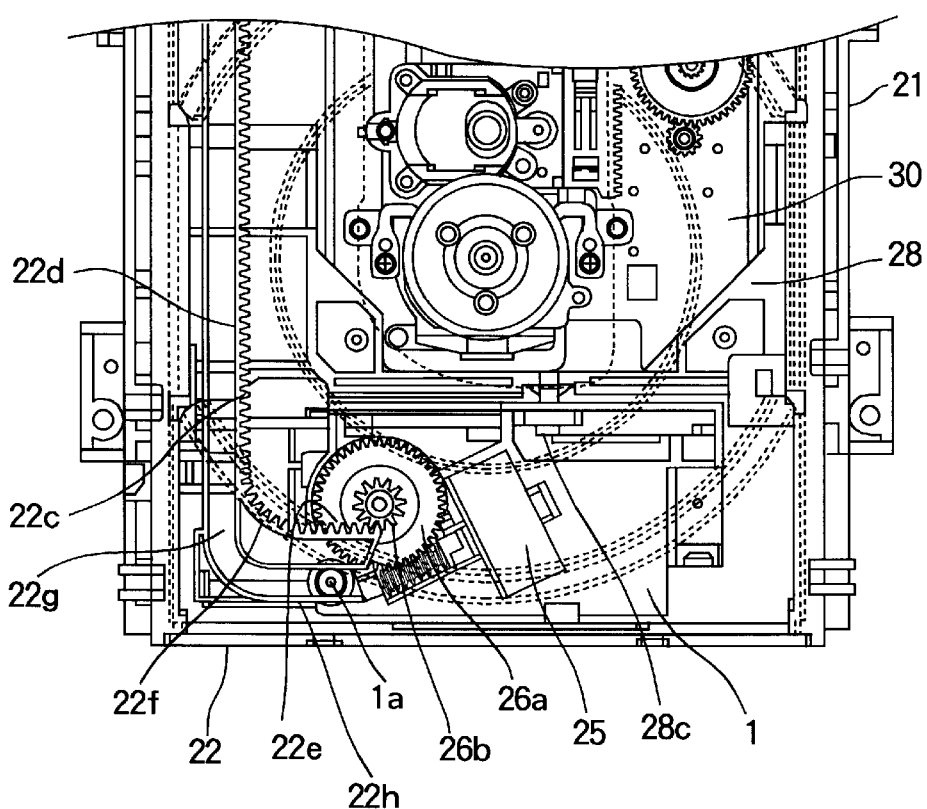
FIG. 3 is a top view of the disk apparatus.
Figure 3:
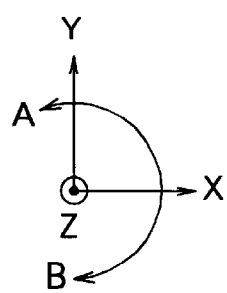

FIG. 2 is a perspective view illustrating a pertinent portion of the disk apparatus. FIG. 3 is a top view of the disk apparatus.

Figure 4A:
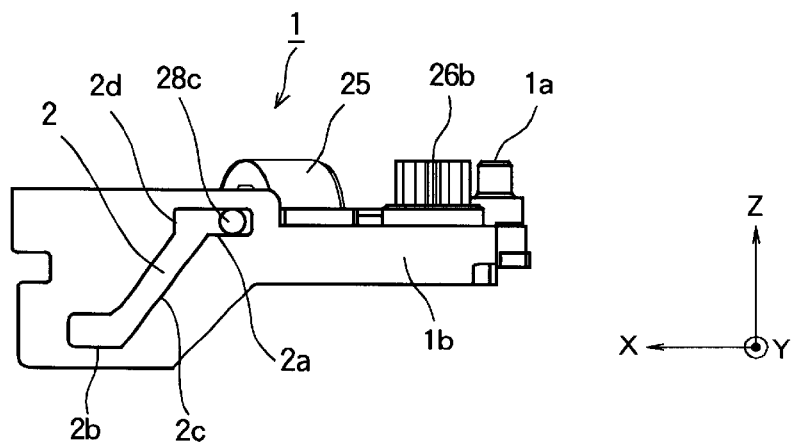
FIGS. 4A–4C illustrate the operation of the disk apparatus.
Figure 4B:
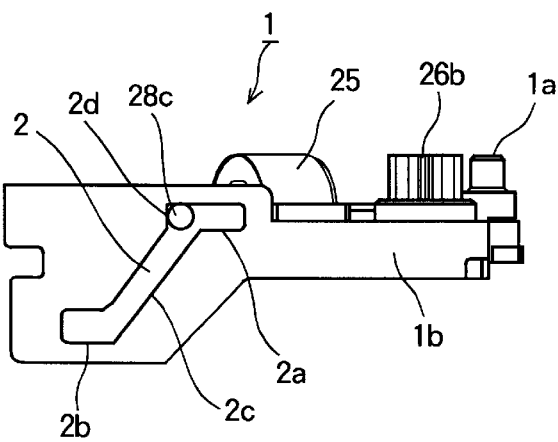
Figure 4C:
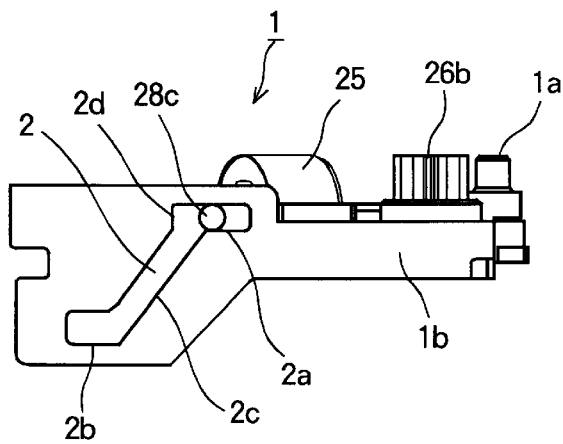

FIGS. 4A–4C illustrate the operation of the disk apparatus.

Figure 9:
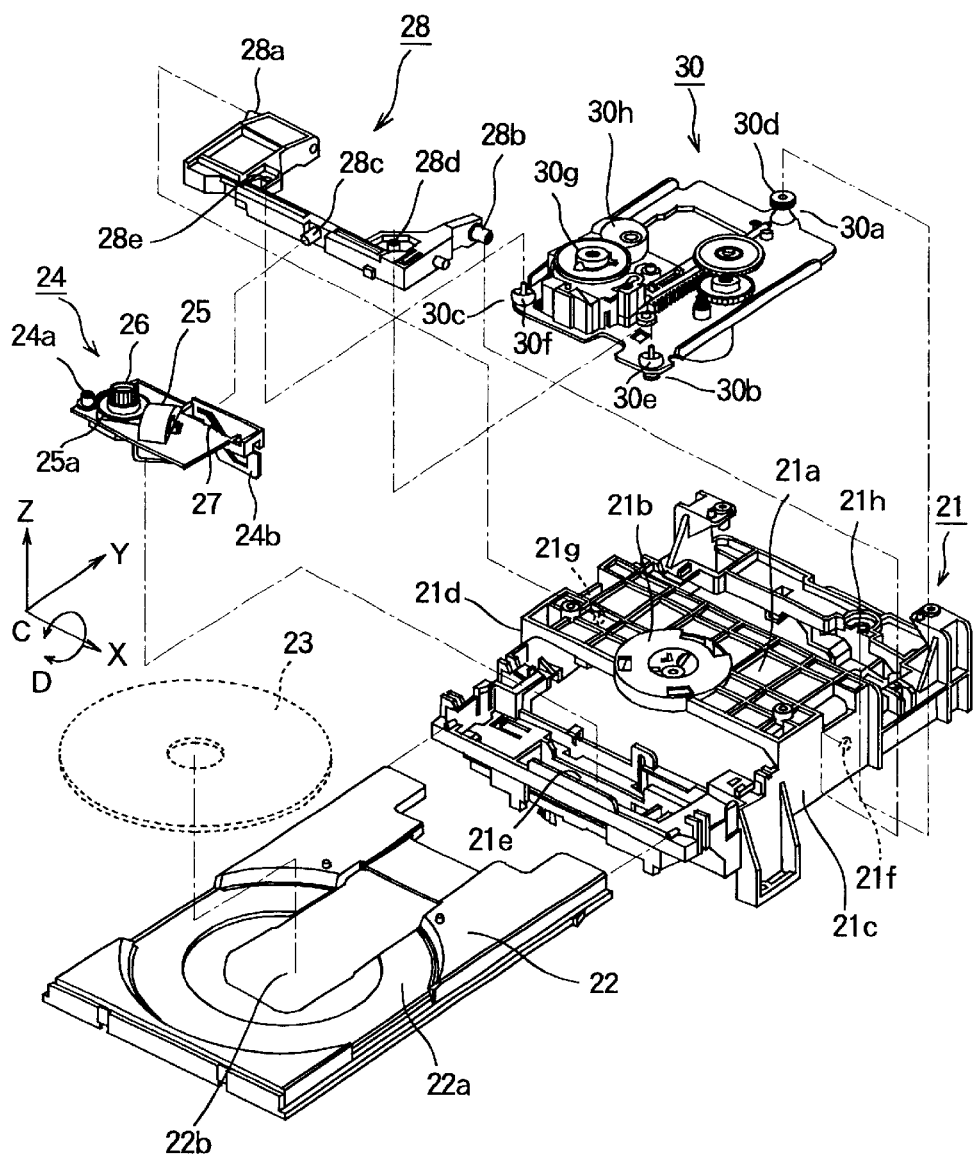
FIG. 9 is an exploded perspective view of a disk-loading mechanism of a conventional disk apparatus.
Figure 10:
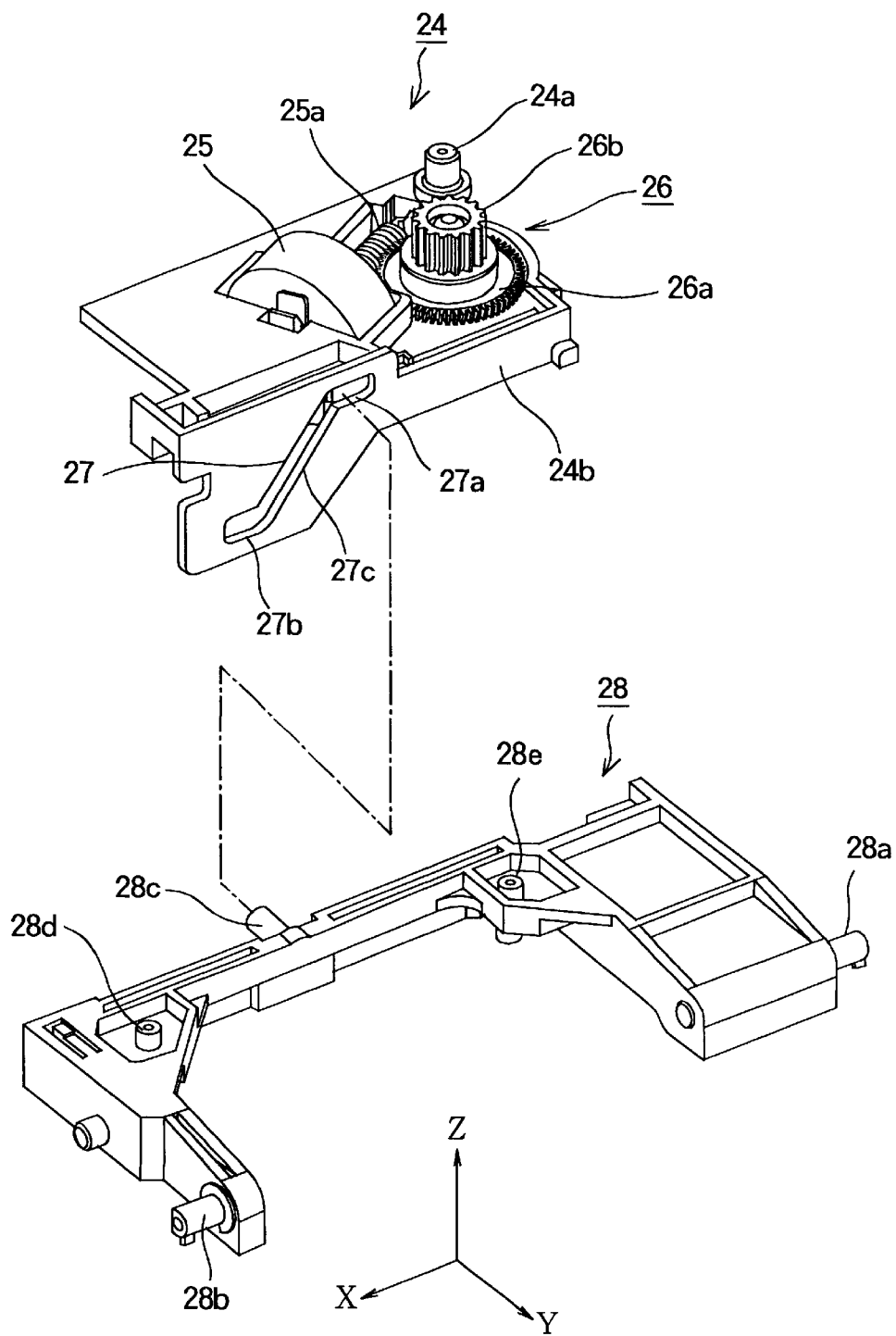
FIG. 10 is a perspective view of a pertinent portion of the disk apparatus of FIG. 9.
Figure 11:
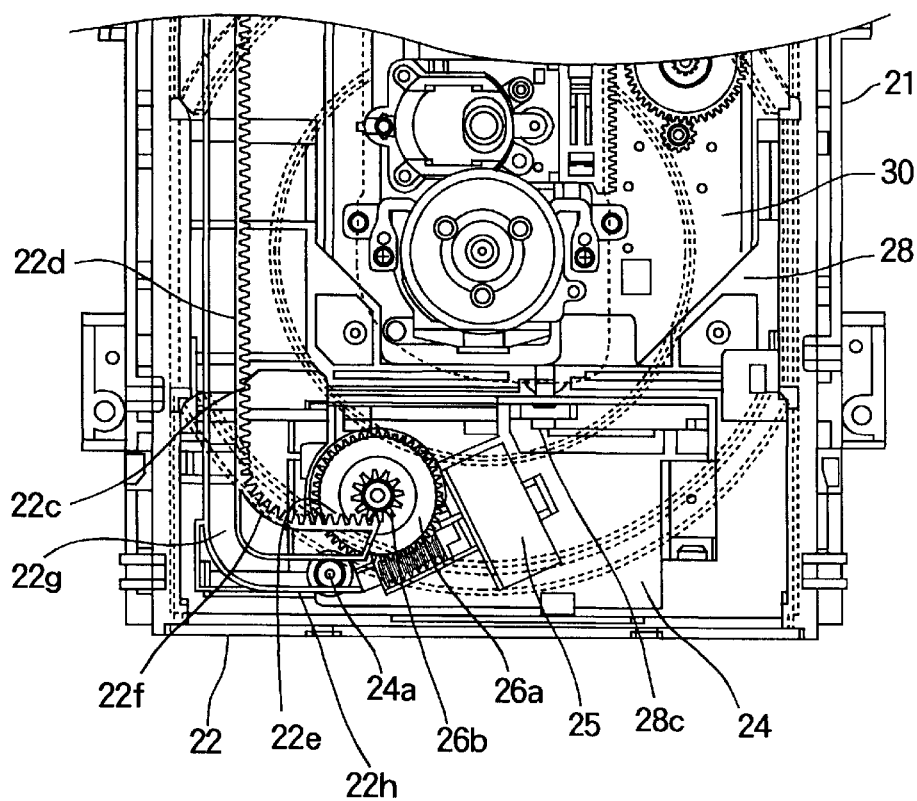
FIGS. 11 and 12 are top views of the disk apparatus of FIG. 9.
Figure 11:
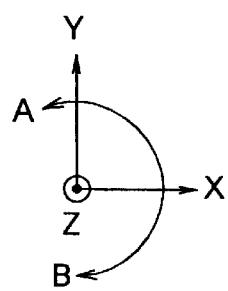
Figure 12:
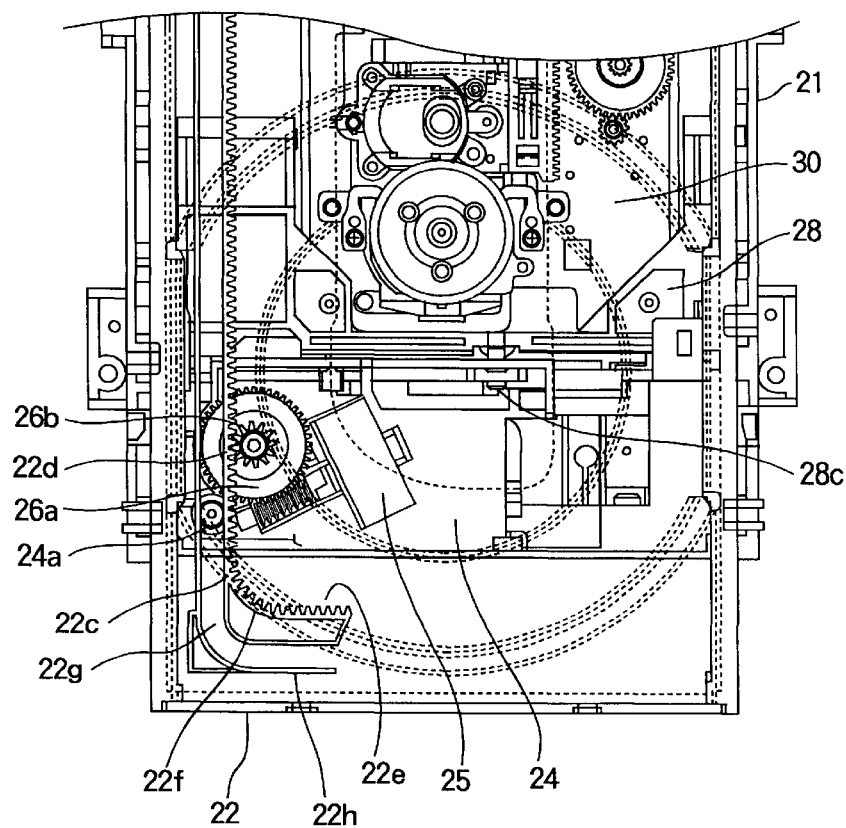
Figure 12:
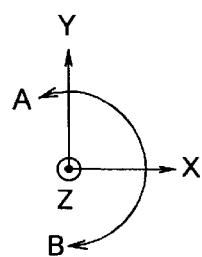
Figure 13A:
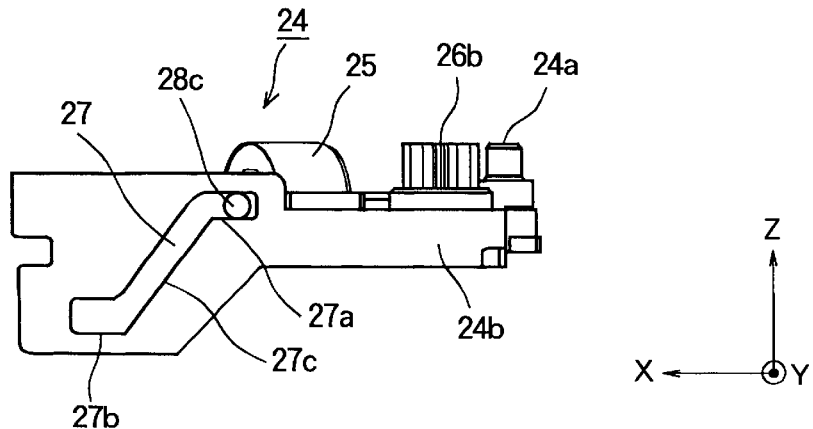
FIGS. 13A–13C are illustrative diagrams, illustrating the operation of the apparatus.
Figure 13B:
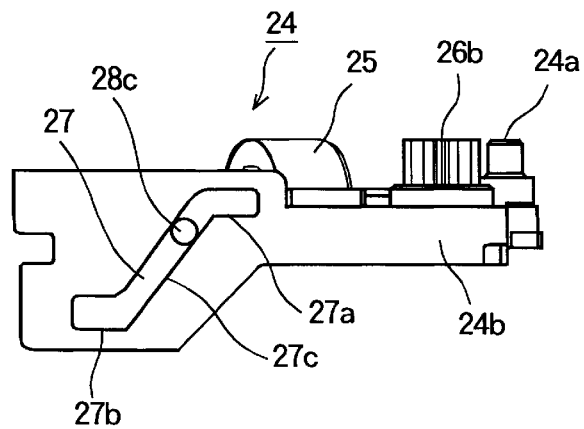
Figure 13C:
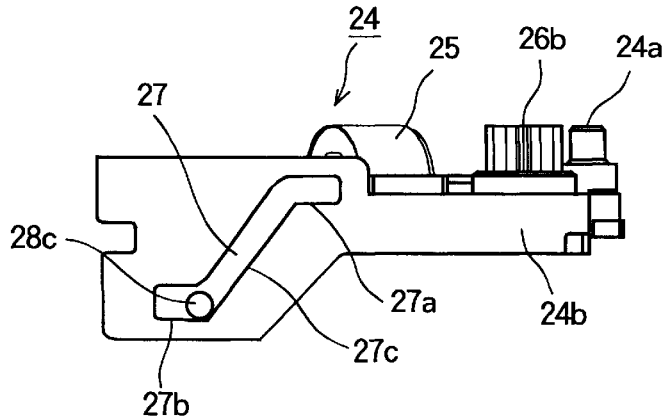

Structural elements similar to those in FIG. 9 have been given the same reference numerals and the description thereof is omitted. The following description will be focussed on only those different from FIG. 9.

Throughout the figures, a disk tray 22 moves on a Y-axis and a disk 23 is placed in a plane in which an X-axis extends and is perpendicular to the Y-axis.

Referring to FIG. 2, a slider cam 1 has a side wall 1b that lies in a plane in which the X-axis and Z-axis lie. The side wall 1b has a cam groove 2 formed therein. The cam groove 2 includes an upper horizontal groove 2a, a lower horizontal groove 2b, and an inclined groove 2c. The inclines groove 2c is provided at an obtuse angle with the upper horizontal groove 2a and the lower horizontal groove 2b to form a path of a projection 28c, and communicates with the upper horizontal groove 2a and the lower horizontal groove 2b. The upper horizontal groove 2a has a collision section 2d at its one longitudinal end that connects to the incline groove 2c. It is to be noted that the collision section 2d extends substantially perpendicular to the direction of the upper horizontal groove 2a.

When the disk apparatus is loaded with and the disk is unloaded from the disk apparatus, the disk apparatus operates in exactly the same way as the conventional disk apparatus of FIG. 9. However, the disk apparatus according to the first embodiment responds to shocks encountered during transportation in a way different from the conventional apparatus. Thus, the following description will be focussed on the manner in which the first embodiment responds to mechanical shocks.

When the disk apparatus according to the first embodiment is transported, the respective sections of the apparatus are set to corresponding standby positions.

FIG. 3 is a top view of the apparatus when it is seen in a direction of the Z-axis toward the origin, illustrating the positions of the respective sections of the apparatus at the standby positions.

FIGS. 4A–4C illustrate a projection 28c that moves along the cam groove 2.

FIG. 4A shows the disk apparatus when it is at the standby state.

When a shock resulting from, for example, drop is applied to the apparatus in the direction of the Z-axis toward the origin, the slider cam 1 is caused to move in the same direction so that a pinion gear 26b in mesh with a rack gear 22c rotates.

At this moment, a collision section 2d formed on the slider cam 1 collides against the projection 28c of a lift arm 28 as shown in FIG. 4B.

Due to the fact that the slider cam 1 is moved by a shock, the collision section 2d collides against the projection 28c at a high speed as shown in FIG. 4B. As a result, the projection 28c repels the slider cam 1 toward the origin. In this manner, every time a shock is given to the apparatus in the direction of the X-axis, the projection 28c moves back and forth in the horizontal groove 2a.

The limited movement of the slider cam 1 allows the boss 1a of the slider cam 1 to stay within the home portion 22h of the guide groove 22g (FIG. 3). Thus, even when a shock is exerted on the slider cam in a direction of the Y-axis toward the origin, the disk tray 22 will not project outward beyond the loading position where the disk tray 22 remains in the apparatus.

As described above, according to the first embodiment, the movement of the slider cam 1 due to external shocks during, for example, transportation is restricted so that the reproduction unit stays at the standby state.

Second Embodiment

A disk apparatus according to a second embodiment differs from that of the first embodiment in the shape of a cam groove formed in a slider cam.

Figure 5:
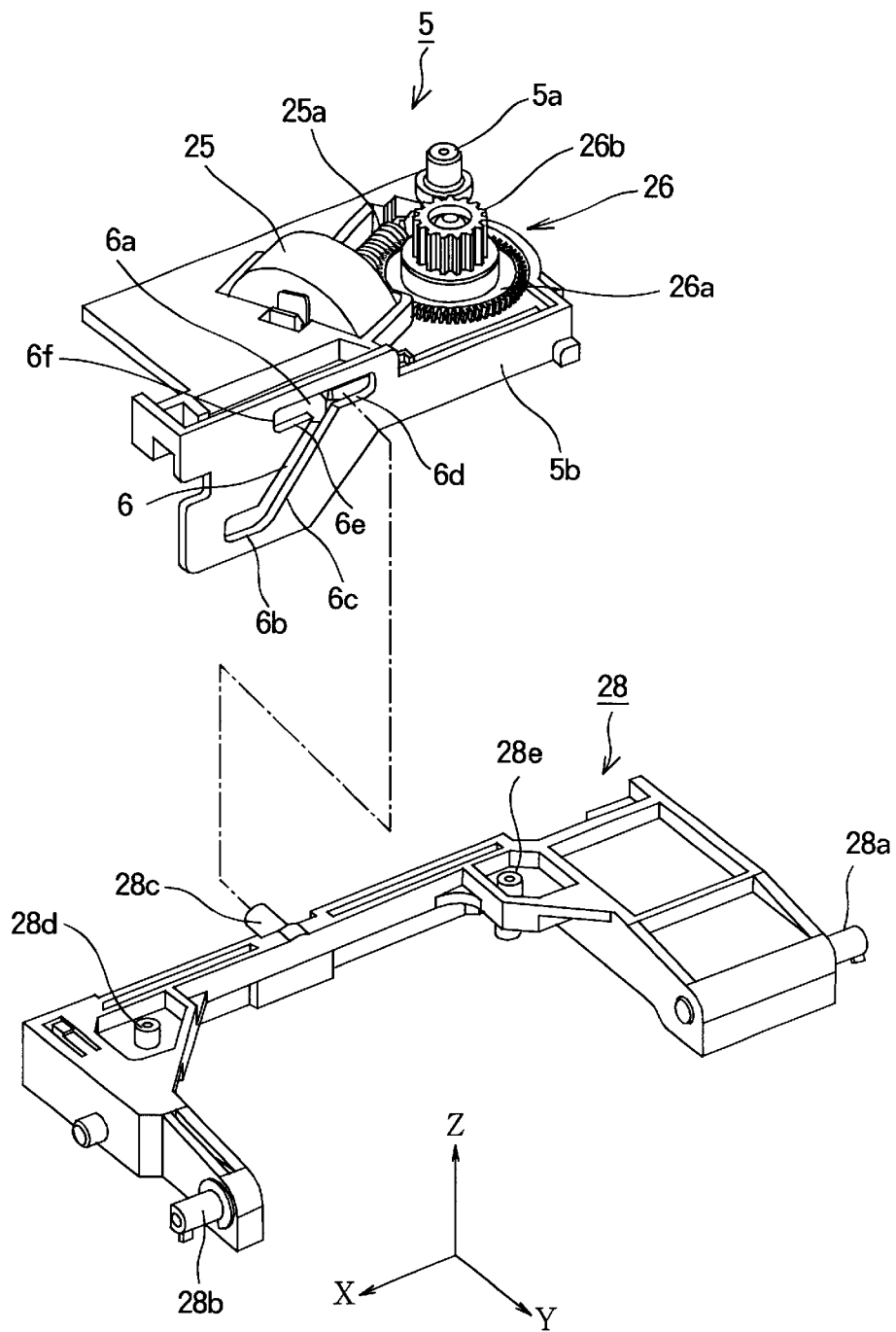
FIG. 5 illustrates a slider cam 5 according to the second embodiment.

FIG. 5 illustrates a slider cam 5 according to the second embodiment. The second embodiment will now be described with reference to FIGS. 7A–7D in terms of the structure and operation related to the slider cam 5 and the other parts of structure and operation are omitted.

A vertical wall 5b of the slider cam 5 is formed with a cam groove 6 therein. The cam groove 6 includes an upper horizontal groove 6a, a lower horizontal groove 6b, and an inclined groove 6c. The inclined groove 6c communicates with a mid way portion of the upper horizontal groove 6a, thereby dividing the upper horizontal groove 6a into a normal guide portion 6d and a buffer guide portion 6e.

When a disk is loaded and unloaded, the disk apparatus operates in the same way as the conventional disk of FIG. 9 and therefore the description thereof is omitted. The second embodiment operates much the same way as first embodiment except when shocks are exerted on the apparatus during transportation. Thus, the description will be given of the operation of the second embodiment when shocks are exerted during transportation.

Figure 6:
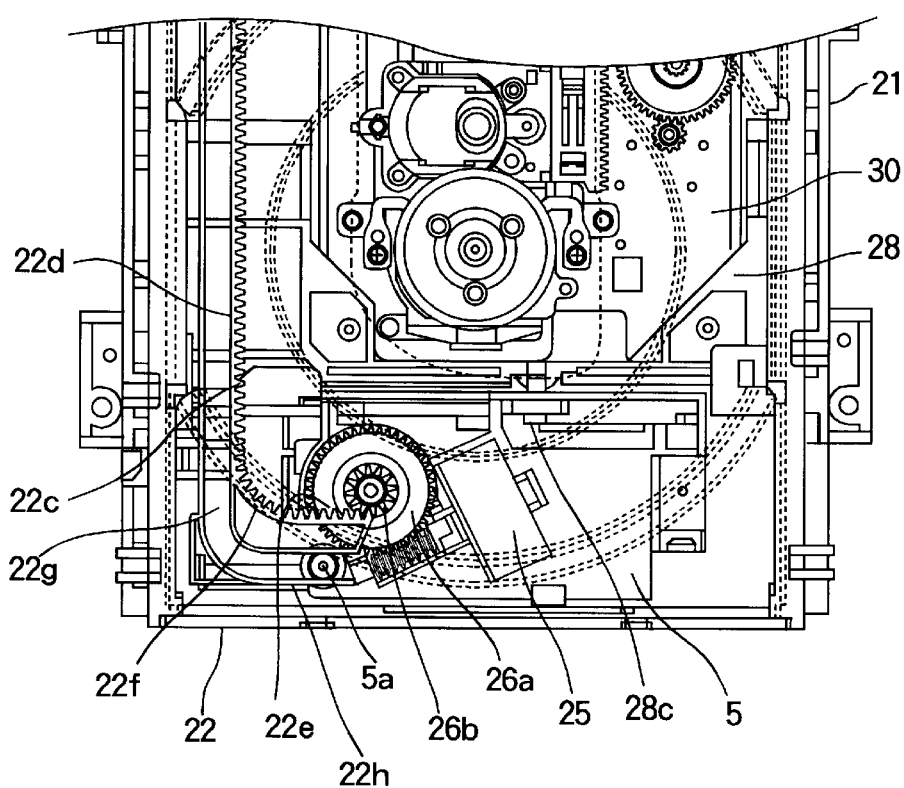
FIG. 6 is a top view of the disk apparatus as seen in a direction of the Z-axis when the apparatus is at the standby position.
Figure 6:
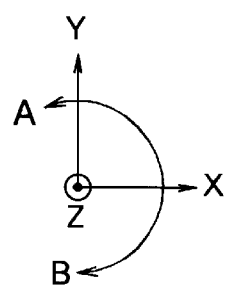

FIG. 6 is a top view of the disk apparatus as seen in the direction of the Z-axis when the apparatus is at the standby position.

When the disk apparatus according to the second embodiment is transported, the respective sections of the apparatus are set to their standby positions. When a shock is given to the disk apparatus in the direction of the X-axis toward the origin, the slider cam 25 is caused to move in the same direction so that the pinion gear 26b rotates.

Figure 7A:
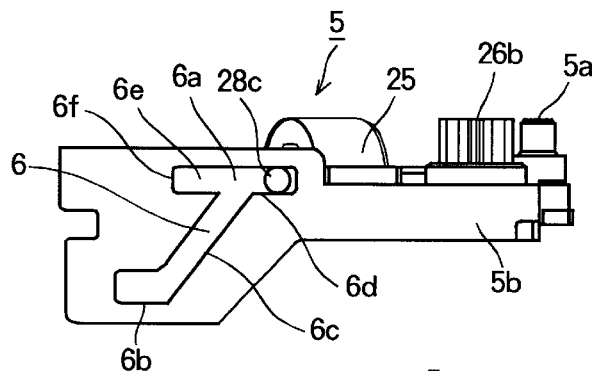
FIGS. 7A–7D illustrate the projection 28c that moves along the cam groove 2.
Figure 7B:
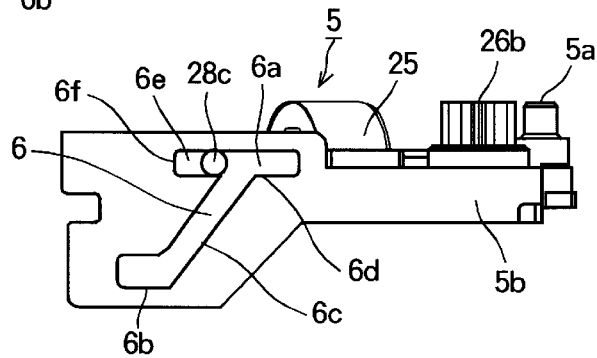

Thus, as shown in FIG. 7B, the slider cam 5 moves such that the projection 28c of the lift arm 28 moves into the buffer guide portion 6e of the upper horizontal groove 6a. FIGS. 7A–7D illustrate the projection 28c that moves along the cam groove 2. FIG. 7A shows the disk apparatus when it is at the standby state.

Figure 7C:
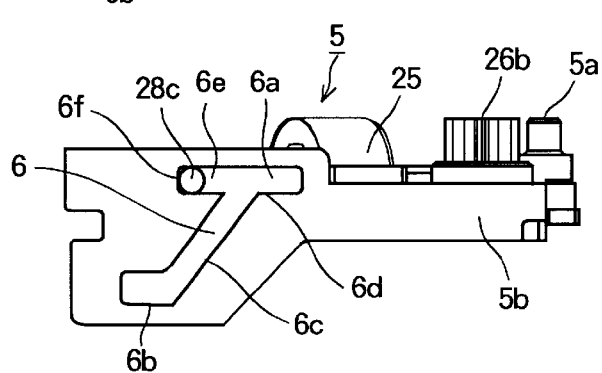
Figure 7D:
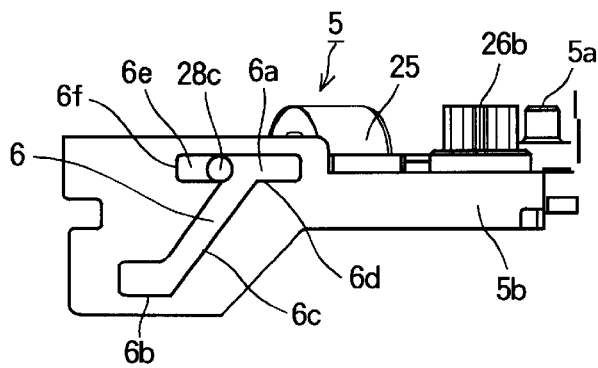

As shown in FIG. 7C, if shocks are applied repeatedly in the direction of the X-axis toward the origin, the end 6f of the buffer guide portion 6e of the upper horizontal groove 6a collides against the projection 28c of the lift arm 28. The shock exerted on the slider cam 5 causes the end 6f to collide against the projection 28c at a high speed. The projection 28c repels the slider cam 5 in the direction of the X-axis away from the origin to the position of FIG. 7D where the projection 28c is again in the buffer guide portion 6e. In this manner, every time a shock is exerted in the direction of the X-axis, the slider cam 5 moves back and forth such that the projection 28c reciprocates in the upper horizontal groove 6a relative to the slider cam 5.

As described above, according to the second embodiment, the movement of the slider cam 5 due to external shocks during, for example, transportation is restricted so that the reproduction unit remains held at the standby state.

The limited movement of the slider cam 5 allows the boss 1a of the slider cam stays within the home portion 22h of the guide groove 22g (FIG. 6). Thus, even when a shock is exerted on the slider cam in the direction of the Y-axis toward the origin, the disk tray 22 will not project outward beyond the loading position where the disk tray 22 is retracted in the apparatus.

The aforementioned embodiments have been described in terms of a cam groove formed in the slider cam and a projection that is provided on the lift arm and engages the cam groove. Instead, the cam groove may be formed in the lift arm and the projection may be formed on the slider cam and engage the cam groove.

Modification of Cam Groove

Figure 8A:
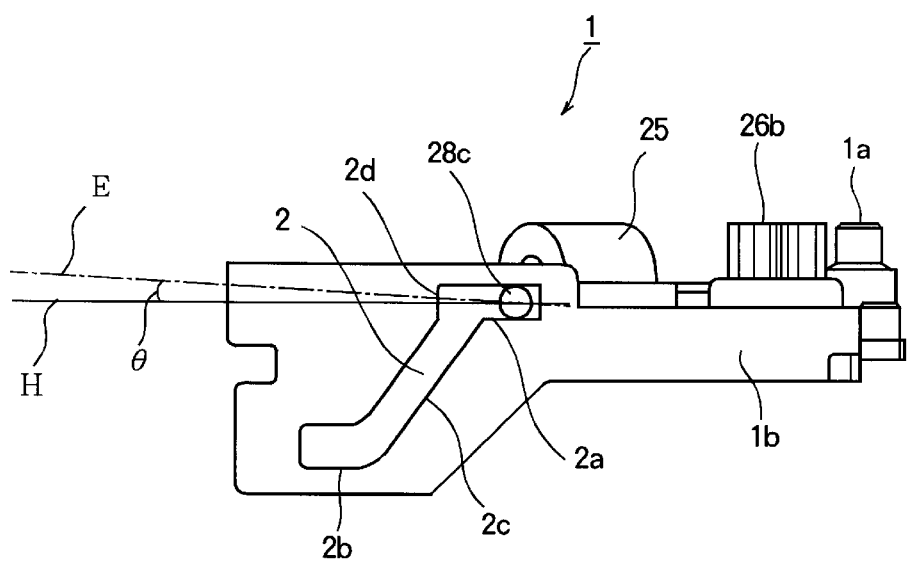
Figure 8B:
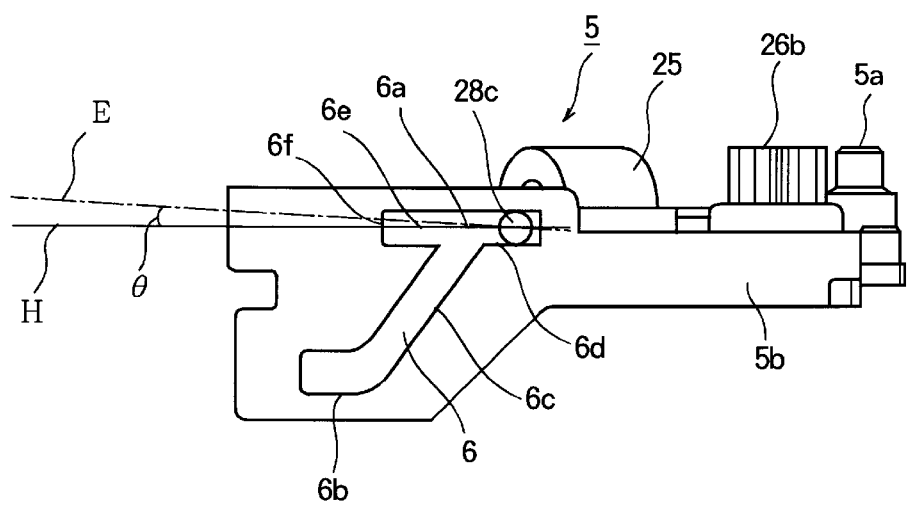

FIGS. 8A and 8B illustrate inclined upper horizontal grooves 2a and 6a. In the aforementioned embodiments, the upper horizontal groove 2a and upper horizontal groove 6a extend in the direction of the X-axis. The upper horizontal groove 2a and upper horizontal groove 6a may be inclined slightly so that the projection 28c slides down away from the collision section 2d and the end 6f due to the weight of the reproducing unit 30. Referring to FIGS. 8A and 8B, the upper horizontal groove 2a and upper horizontal groove 6a extend in a direction shown by arrow E that makes an angle θ with a horizontal line H. This construction allows the projection 28c to stay at or return to an end portion opposite to the collision section 2a or the end 6f.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A disk apparatus having;
   a slider cam movable on a first axis back and forth between a first position and a second position, said slider cam having a cam groove;
   a disk tray movable on a second axis substantially perpendicular to the first axis between a third position and a fourth position, the slider cam being at the first position when the disk tray is at the third position and at the second position when the disk tray is at the fourth position;
   a reproducing assembly having a cam follower that is guided in the cam groove such that said reproducing assembly is at a reproducing position when said slider cam is at the first position and at a non-reproducing position when said slider cam is at the second position;
   wherein the cam groove comprises:
      a first groove that extends substantially parallel to the first axis;
      a second groove that extends substantially parallel to the first axis; and
      a third groove that communicates with a first longitudinal end portion of the first groove and a second longitudinal end portion of the second groove to form a path of the cam follower at an obtuse angle with the first and second grooves, the first longitudinal end portion having a groove wall that extends substantially perpendicularly to the first axis.

2. The disk apparatus according to claim 1, wherein the cam groove extends in a plane substantially normal to the second axis.

3. The disk apparatus according to claim 1, wherein the cam follower is in the first groove when said slider cam is at the first position and in the second groove when said slider cam is at the second position.

4. The disk apparatus according to claim 3, wherein the first groove is inclined to make an angle with a horizontal line such that the cam follower slides down away from the groove wall due to a weight of said reproducing assembly.

5. A disk apparatus having;
   a slider cam movable on a first axis back and forth between a first position and a second position, said slider cam having a cam groove;
   a disk tray movable on a second axis substantially perpendicular to the first axis between a third position and a fourth position, the slider cam being at the first position when the disk tray is at the third position and at the second position when the disk tray is at the fourth position;
   a reproducing assembly having a cam follower that is guided in the cam groove such that said reproducing assembly is at a reproducing position when said slider cam is at the first position and at a non-reproducing position when said slider cam is at the second position;
   wherein the cam groove comprises:
      a first groove that extends substantially parallel to the first axis and has a first longitudinal end and a second longitudinal end;
      a second groove that extends substantially parallel to the first axis and has a third longitudinal end and a fourth longitudinal end; and
      a third groove, the third groove communicating with the first groove between the first and second longitudinal ends, dividing the first groove into first guide portion and a second guide portion, and with the second groove between the third and fourth longitudinal ends to form a path of the cam follower at an obtuse angle with the first and second grooves.

6. The disk apparatus according to claim 5, wherein the cam groove extends in a plane substantially normal to the second axis.

7. The disk apparatus according to claim 5, wherein the cam follower is in the first groove when said slider cam is at the first position and in the second groove when said slider cam is at the second position.

8. The disk apparatus according to claim 7, wherein the first groove is inclined to make an angle with a horizontal line such that the cam follower slides down away from the groove wall due to a weight of said reproducing assembly.

* * * * *